A. L. DE LEEUW.
FEEDING MECHANISM FOR MACHINE TOOLS.
APPLICATION FILED SEPT. 27, 1911.

1,116,031.

Patented Nov. 3, 1914.
4 SHEETS—SHEET 3.

UNITED STATES PATENT OFFICE.

ADOLPH L. DE LEEUW, OF CINCINNATI, OHIO, ASSIGNOR TO THE CINCINNATI MILLING MACHINE COMPANY, OF OAKLEY, CINCINNATI, OHIO, A CORPORATION OF OHIO.

FEEDING MECHANISM FOR MACHINE-TOOLS.

1,116,031.          Specification of Letters Patent.         Patented Nov. 3, 1914.

Application filed September 27, 1911. Serial No. 651,644.

*To all whom it may concern:*

Be it known that I, ADOLPH L. DE LEEUW, a citizen of the United States, residing at Cincinnati, in the county of Hamilton and State of Ohio, have invented certain new and useful Improvements in Feeding Mechanism for Machine-Tools, of which the following is a specification.

My invention relates to an improvement primarily in feeding mechanism for machine tools, in which a variety of feeds either forward or reverse are obtainable and also a fast power carriage or table movement in either direction up to the point of cutting, together with means for automatically controlling the feeds and speeds.

The fundamental object of the invention is to provide a simple and convenient means adaptable to all machine tool organizations for producing an acceptable range of slow feeds in either direction, and through the same means to enable the element to be fed to be moved rapidly in either direction up to the point of cutting. This mechanism also lends itself admirably to the introduction of automatic tripping devices into this controlling system of speeds and feed organization, thereby endowing the tool with the fullest capacity for work demanded by advanced practice, and also enabling the production of certain new results and performances which will be later described and which I believe to be broadly new and useful.

Another object of my invention is to provide feeding mechanism having a feed screw and nut, each adapted to be revolved independently or simultaneously to produce various ranges of forward feed or reverse, and in which the rotative elements always move when fed by power in one direction to reciprocate or feed the traveling element, carriage or table of a machine tool, and provides a form of mechanism simple and compact, with a relatively small number of components.

Another object of my invention is to provide a screw and nut comprising the main feeding elements with means for controlling their relative or independent rotation automatically and predetermined by the distance of travel of the fed elements of the machine tool.

Another object of my invention is to provide a rotative feed screw and nut with means for controlling their rotation independently and simultaneously with automatic trip mechanism for operating the same at predetermined limits of travel of the fed element.

Another object of my invention is to provide feeding mechanism comprising a feed screw and nut, each adapted to be rotated independently or simultaneously relative to each other, with a variable speed system of gearing in driving connection with the nut for revolving the same at different ratios of speed and mechanism for controlling the rotation of both screw and nut, whereby the rotation of the screw alone produces a feed in one direction, the rotation of nut in an opposite direction and the rotation of both screw and nut in the same direction as that produced by revolving the nut alone, but at a slower ratio.

Another object of my invention is to provide a driving shaft and a screw feed shaft and revolving nut arranged in parallel planes with the driving shaft adapted to revolve both screw and nut, clutching mechanism for controlling the same, whereby the feed of the traveling element is produced in either direction with the rotation of the screw and nut in the same direction through the control of the driving connections between the driving shaft and feeding elements.

Another object of my invention is to provide a nut and screw each adapted to be rotated, with means for automatically controlling their independent or simultaneous rotation.

Another object of my invention is to provide means for quickly and conveniently controlling the feed of a traveling element of a machine tool at various intervals in its travel, to produce a variety of speed feeds in one direction, or to bring the same at rest, or automatically return the same to its initial position of travel by controlling the rotation of a feed screw and nut to rotate the same either independently or simultaneously.

Another object of my invention is to provide means for automatically controlling the travel of a carriage of a machine tool by a series of tripping members arranged on and movable with the carriage, each adapted to engage at predetermined intervals; tripping mechanism for controlling the rotation of the feeding elements, in which a second desired feed movement is functional after the operation of the first, the one being coördinate with the second in progressive steps, and in which the operation of one is resultant upon the operation of the preceding, enabling a variety of feed controls of different ratio to be procured in the travel of the carriage in one direction, at predetermined intervals.

Another object of my invention is to provide means for locking the screw or nut against rotation when in an idle position.

Another object of my invention is to provide means to prevent simultaneous locking of the nut and screw in operating a hand feed.

The various features of my invention will be more fully set forth in the description of the accompanying drawings, forming a part of this specification, in which:—

1 represents the frame of the machine, upon which the carriage or table 2 is slidably mounted common in the art.

3 represents a casing attached to the side of the frame 1 of the machine, and within which the various elements of my feeding mechanism are compactly supported.

4 represents the main power driving shaft suitably journaled within the casing, and is in driving connection with the main source of power of the machine, not herewith illustrated.

Figure 1:
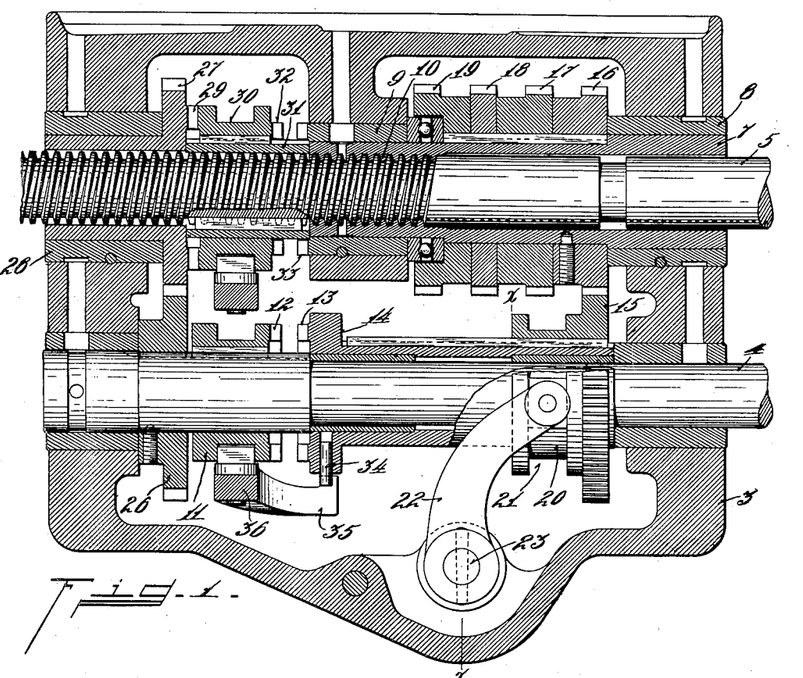
Figure 1 is a central vertical section through the casing and feeding elements adapted to be suspended or connected to the frame of the machine in a proper elevation, with its carriage or traveling table which carries with it the screw feed shaft.

5 represents the feed screw shaft suitably journaled at each end of the carriage or table 2, moving therewith and projected through the casing 3, as illustrated in Fig. 1.

The feeding mechanism in general is substantially the same as that illustrated in an application filed by me October 31, 1910, Serial No. 589,913, for feeding mechanism for machine tools, and in function and result while the construction herein illustrated is considerably modified.

The analogous features between this invention and that shown and described in the aforesaid application reside in a feeding mechanism employing a feed screw and driving nut with a variable speed system of gearing for driving the nut at various ratios of speed, with means for driving the screw or nut independently or simultaneously to control the direction of feed, or the speed of the feed, but it is obvious that any of the well-known types of speed changing mechanism or systems within the scope of the claims of gearing may be employed without departing from the features of this invention.

7 represents a nut journaled within the bearing sleeves, 8 and 9, suitably fixed within bearings formed in the casing 3, see Fig. 1, and in which the nut is of elongated form, with only a portion thereof provided with the screw threads 10, adapted to engage with the threads of the screw feed shaft 5. By this construction the nut is provided with a considerable bearing surface, which is always an important consideration in supporting the rotating elements of a machine tool, and thereby preventing vibration or chatter, as well as prolonging the life of the machine.

The screw is revolved as follows:—11 represents a clutch collar splined upon the shaft 4 provided with the clutch teeth 12, adapted to be engaged with the clutch teeth 13 formed on the sleeve 14, loosely supported upon the driving shaft 4. 15 represents a gear splined upon the sleeve 14, and adapted to be slid thereon to enable the gear 15 to be engaged with any one of the gears 16, 17, 18 and 19, fixed upon the nut 7, to produce a variety of speed results to the nut.

As illustrated, the gears 16, 17, 18, and 19 are of the same diameter, but each having a different number of teeth, and which will give the desired results when the system is employed for driving feeding mechanism, and has the advantage of enabling the gear 15 to be readily shifted laterally to engage the same with any one of the gears of the series, and which feature has been described at length in my said former application. In the form herein illustrated it produces a simple and compact arrangement, with very few parts, but it is obvious that other speed systems of gearing can be employed between the nut and driving shaft to produce equal results.

Figure 2:
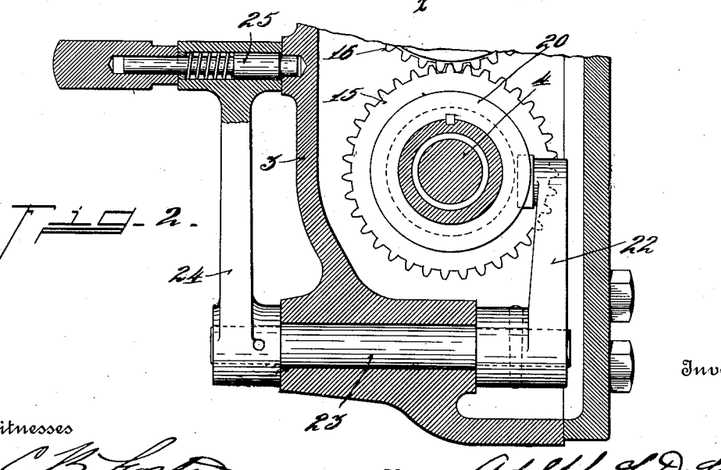
Fig. 2 is a section on line $x$, $x$, Fig. 1.

The gear 15 is provided with a hub extension 20 having an annular groove 21, into which the arm 22 of the shifting mechanism engages. The arm 22 is fixed to a rock shaft 23, see Figs. 1 and 2, journaled within a bearing formed in the casing 3, and projecting through the same, and 24 represents a hand lever fixed to the rock shaft, with its opposite end provided with a detent mechanism 25 for locking the handle, gear and shifting mechanism in any adjusted position.

The screw shaft 5 is rotated and controlled as follows:—26 represents a gear fixed to the feed shaft 4 in mesh with a gear 27 loosely journaled within the bearing sleeve 28 fixed within the frame 3, with the screw projected through the bore of the gear 27, and substantially free therewith. The gear 27 is provided with clutch teeth adapted to engage with clutch teeth 29 formed on the clutch collar 30, splined upon the sleeve 31, said sleeve 31 in turn being keyed, or splined on the screw shaft 5. The sleeve 31 being provided to secure free and easy movement in the shifting actions of the clutch collar 30 and also forms better practice than by sliding the collar 30 directly upon the screw. Thus, when the clutch collar 30 is thrown to the left into engagement with the gear 27, the screw is in driving connection with the shaft 4 for revolving the screw.

It is desirable to lock the screw shaft or nut against rotation while one or the other is rotating and this is accomplished as follows:—Upon the opposite face of the clutch collar 30 clutch teeth 32 are provided adapted to engage with teeth 33 formed in the bearing sleeve 9, which is held against rotation, or fixed within the bearings of the frame 3. As the clutch member 30 is keyed indirectly through the sleeve 31 to the screw shaft 5, it will be seen that when the teeth of the clutch collar 30 are engaged with the teeth of the bearing sleeve 9, the screw 5 will be locked against rotation, and that such position of the collar is opposite from its engagement with the gear 27 when in driving connection, whereby it is impossible to lock the screw against rotation, and at the same time maintain it in driving connection.

The nut is locked by providing the sleeve 14 with a pin 34 projecting therefrom, and adapted to engage with an arm 35 projecting from the clutch shifting lever 36 moving in the path of rotation of the pin when the lever is swung to a position disengaging the clutch 11 from the sleeve 14. This construction likewise prevents the sleeve 14 from being simultaneously locked and engaged to the driving shaft 4.

The function of locking the screw and nut when they are idle, while not essential in many instances, for if the parts are free the relative characteristics are such that the one will not have a rotative tendency upon the other, but the parts may become slightly bound, and cause the one to rotate the other, which might disturb the feed and injure the work, and therefore, as a precautionary measure, the locking means are provided. It is obvious that such can be variously modified from the construction herein illustrated and therefore, do not wish to be limited to any specific form.

With the control of the clutch members 11 and 30 the various feeds, forward or reverse, are obtained and in providing means for shifting these clutches adapted to be actuated by the carriage or feed member, the device can be automatically controlled. A variety of results is possible, and results from which of the two clutches is actuated, and the position of the second. As for instance, the travel of the carriage can be governed or controlled so as to be fed to the work very fast until it reaches a point where the cutting is commenced in which the nut will be driven and the screw at rest, throwing the screw into driving connection with both screw and nut revolving, produces a slow forward feed through the cutting operation after which the screw is again disengaged, the nut remaining in connection with the drive, resulting in a fast forward feed, following with a second slow forward feed, after which the nut can be disengaged, producing a return travel of the carriage, and thence disengaging the screw, the carriage can be automatically brought to rest at its initial starting position.

In the control of the carriage just described, two differently positioned pieces of work, one in advance of the other were brought to the action of the cutter which number can be multiplied, depending upon the length of travel of the carriage and the size of the work. Again, if only one piece of work were supported upon the table, the carriage could be fed forward fast, to bring the work to the cutter, then slow during the cutting action, after which the carriage could be stopped or returned to normal. A variety of such results is possible, depending largely upon the kind of work machined.

In the drawings I have illustrated the preferred form of automatic control of the clutch members, but it is obvious that the construction can be variously modified without departing from the features of my invention, in which the main object is to provide means for automatically controlling the rotation of screw or nut or bolt at predetermined limits of carriage movement or travel.

Figure 5:
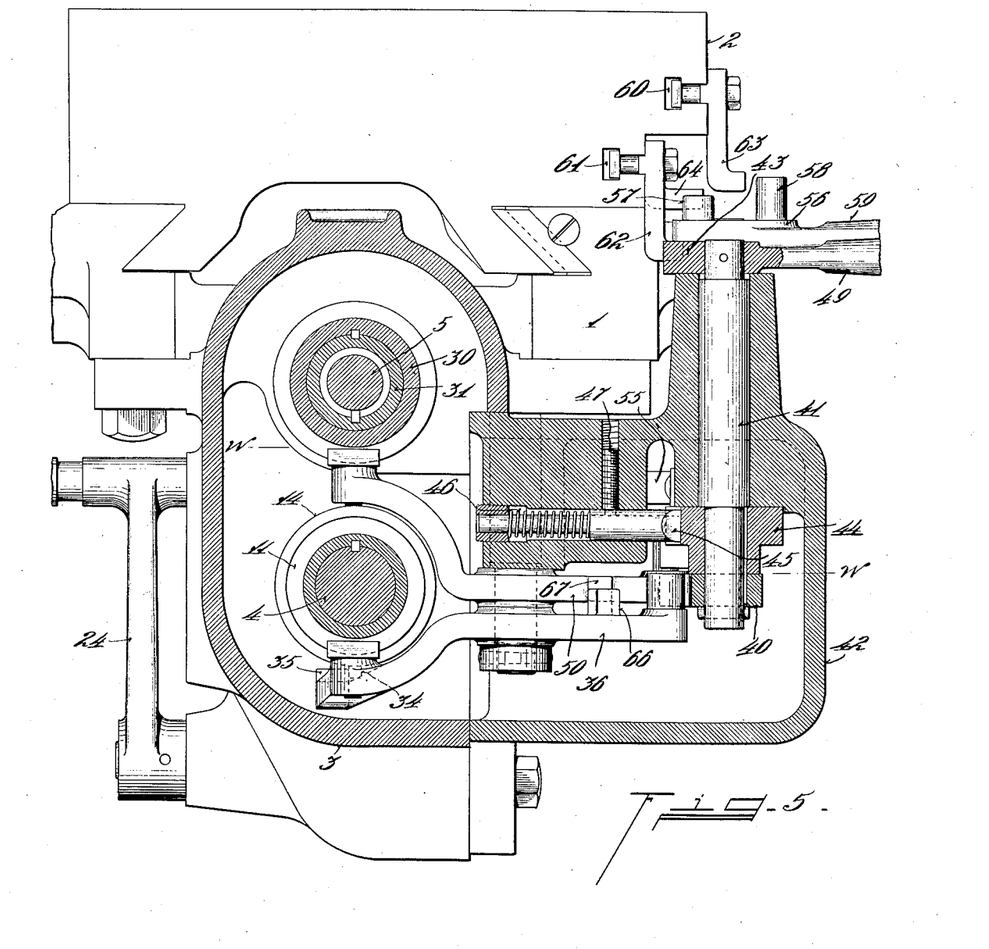
Fig. 5 is a section on line $u$, $u$, Fig. 4, showing the frame and the carriage in elevation.

The following mechanism is provided for automatically controlling the clutch member 11:—36 represents a lever suitably pivoted within the frame 42, see Fig. 5, one end engaging with the annular groove of the clutch member 11, the opposite end engaging with a forked plate 40 fixed upon the rock shaft 41, projected vertically, and journaled within a bearing formed in the supplemental casing 42 fixed to the main casing 3. 43 represents an arm fixed upon the rock shaft 41, adapted to be engaged by a dog or dogs projected from the carriage to rock the shaft 41, and shift the lever 36 in the desired direction to either engage or disengage the clutch member 11 with the sleeve 14, for controlling the rotation of the nut. To insure the shifting of the clutch, means are provided for automatically rocking the shaft 41 after a given positive movement thereof.

Figures 6, 7:
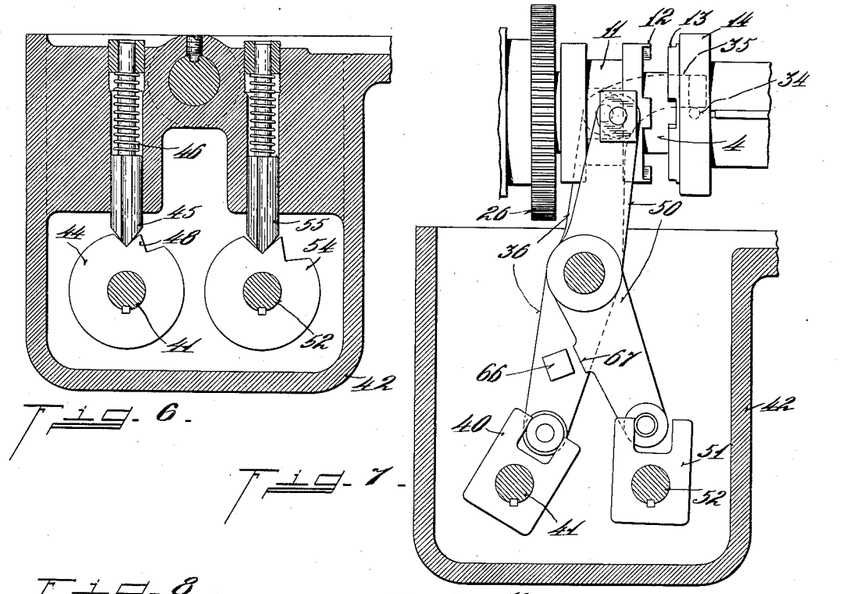
Fig. 6 is a section on line $v$, $v$, Fig. 3.
Fig. 7 is a section on line $w$, $w$, Fig. 5.

44 represents a toothed disk fixed to the rock shaft 41, see Figs. 5 and 6.

45 represents a toothed detent pin slidably mounted within the frame 42, and maintained under outward tension by means of the spring 46, and held against rotation by means of a set screw 47 threaded within the frame 42 and engaging into a groove formed in the detent pin 45. Thus, in rocking the shaft 41, say toward the left, see Fig. 6, the detent will ride upon the tooth 48 of the disk 44, until the apexes thereof engage with each other and bring the apex of the detent pin 45 upon the opposite angle of the tooth, at which position the tripping dog of the carriage has moved the rock shaft and clutch to a point where the clutch has just disengaged from its opposing clutch member, whence the tension of spring 46 will be exerted and move the clutch member the remainder of the movement required, and owing to the clutch member being released from its driving connection with the driven member, very little power is required to throw the clutch. This is also true when the clutch is shifted in the opposite direction after the clutch teeth have initially been engaged.

The rearward portion of the arm 43 is provided with a handle 49, whereby the clutch 11 can be manually controlled.

The clutch member 30 has similar mechanism as that described for clutch member 11, to control the same, and is comprised of the following instrumentalities:—50 represents a lever, see Fig. 5, pivoted upon the same axis as lever 36, with one end thereof engaged within the annular groove formed within the clutch member 30, the opposite end engaging within a forked plate 51, fixed to a rock shaft 52, see Fig. 7, but the connection between lever 50 and the forked plate is such as to provide idle or lost motion between the members in order to insure the proper movement of the clutch member 30, for the reason that it engages clutch teeth at the limits of both movements thereof, right and left. The rock shaft 52 is provided with a toothed disk 54 as that of rock shaft 41, and with a spring controlled detent pin 55, adapted to engage with the tooth or teeth of the disk, performing the same functions and operations I have described for similar mechanism of clutch 11.

Figures 3, 4:
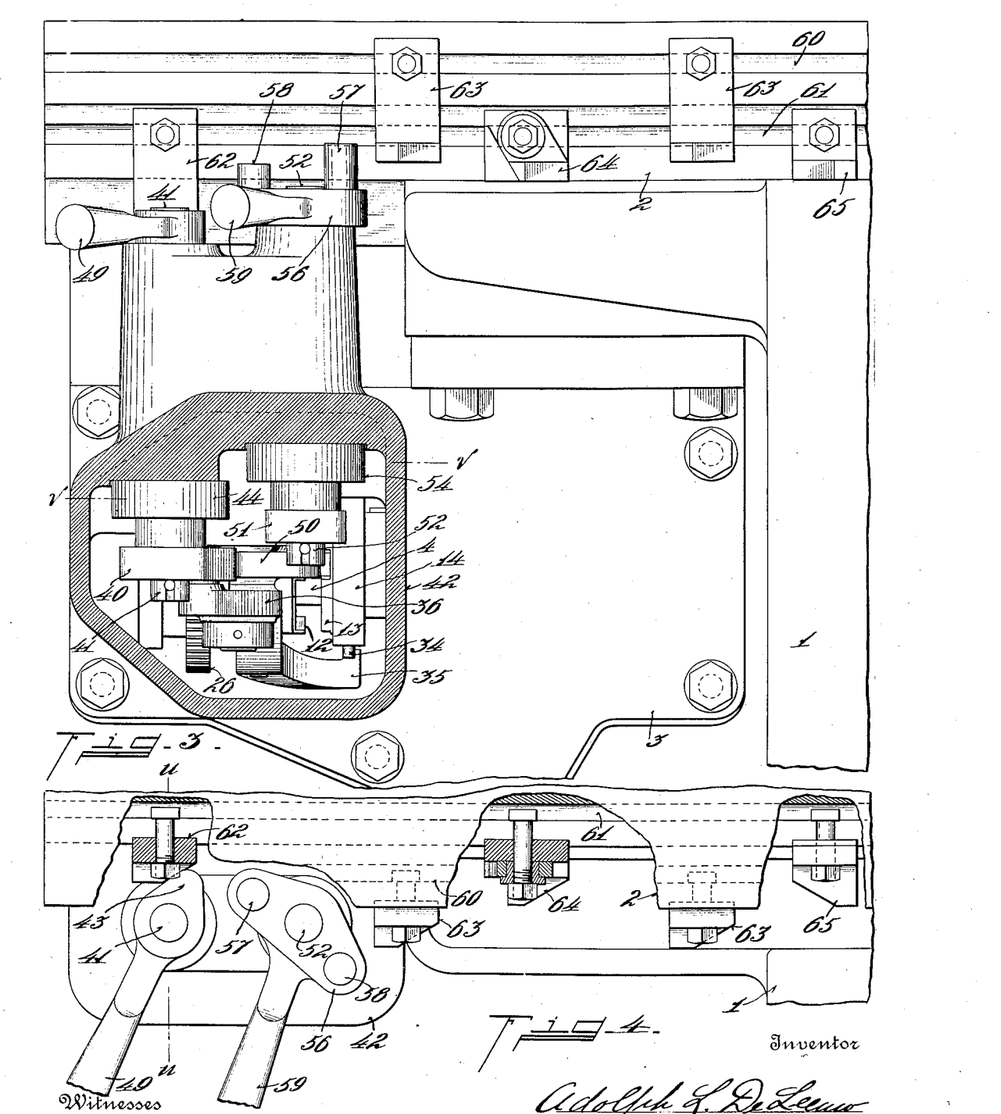
Fig. 3 is an end elevation of the same, partly in section showing a portion of the machine frame, and carriage.
Fig. 4 is a top plan view of the same.

56 represents a lever fixed to the rock shaft 52 see Figs. 3 and 4, provided with the different height pins 57, 58, adapted to be respectively engaged by dogs projected from the carriage for shifting the lever 56 in alternate positions, according to which of the pins is engaged. The lever 56 is also provided with a handle 59 for manual control of the clutch member 30.

As illustrated in the drawings, three sets of tripping dogs are provided, one for tripping the clutch member 11, the second for engaging the pin 57 for shifting the arm 56 in one direction, and the third for engaging the pin 58 to shift the arm or lever 56 in an opposite direction. The table or carriage 2, as will be seen in Fig. 3, is provided with two longitudinal grooves or T-ways 60, 61, to receive the clamping bolts of the respective tripping dogs 62, 63, 64, arranged at predetermined points for automatic control of the carriage travel or feed. The tripping dog 62 of a series engaging with the arm 43 for actuating the clutch member 11 controlling the nut the tripping dog 63 engaging the pin 58 of the lever 56 for throwing the clutch member 30 to the left to engage the same with its driving connection with the screw, while the tripping dogs 64 of the series engage the pin 57, throwing the clutch 30 in an opposite direction, locking the screw against rotation.

The tripping dogs 64 can be arranged to swing when a number of them are employed to move out of position on a reverse travel of the carriage when the stops are arranged to return the carriage upon the completion of the working movements of the carriage. It is obvious that while these dogs are shown arranged in different longitudinal planes, and each provided with a laterally projecting cam surface to engage with the tripping member of the respective clutches, the construction of the dogs can be variously modified and positioned upon the carriage, otherwise than herein shown within the scope of the claims, without departing from the features of my invention, the main object being to provide means movable with the carriage adapted to engage the tripping mechanism controlling the clutches of screw or nut to automatically control the carriage at predetermined limits in its travel.

Figure 8:
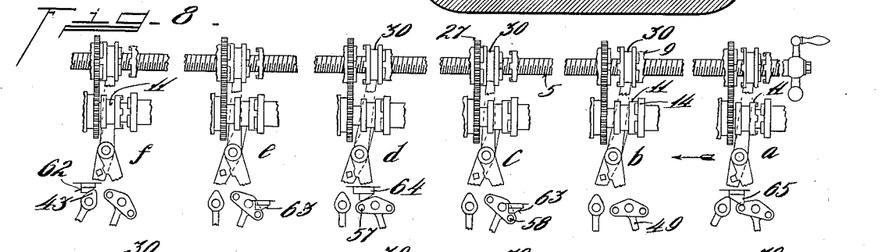
Figs. 8 and 9 are diagrammatic views to illustrate the automatic control of the feed at various intervals of carriage travel to perform various feeding operations.
Figure 9:
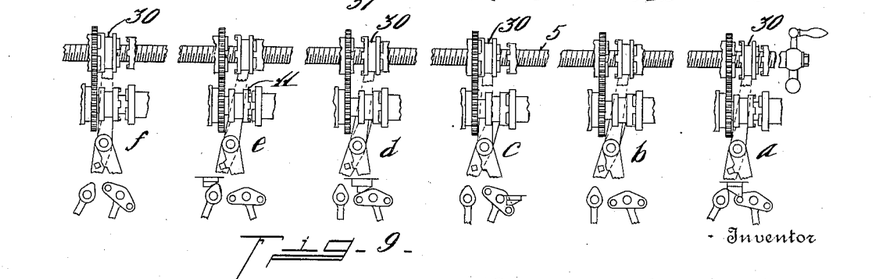

In Figs. 8 and 9, diagrammatic arrangements are illustrated of two different ways of controlling the carriage travel, which will enable a clear understanding of the operation of the automatic trip mechanism. With the carriage traveling in the direction shown by the arrow, Fig. 8, a represents the first position of the clutches, both being disengaged and the carriage at rest, shifting the handle 49 to the right by hand, will throw the clutch member 11 into engagement with the sleeve 14, driving the nut, which position enables the clutch member 30 to become engaged with the lock sleeve 9, locking the screw 5 against rotation, producing a fast forward speed, the members being in position as shown at *b*. After the carriage has moved a predetermined distance toward the work, the pin 58 engages a tripping dog 63, which will throw the clutch member 30 into engagement with the gear 27, producing a slow forward feed, the various elements occupying the position shown at *c* in Fig. 8, feeding the carriage slowly during the cutting operation, after which the clutch member 30 is again disengaged by a tripping dog 64 engaging the pin 57 of the lever 56, whence the shifting elements will occupy the position shown at *d*, producing a fast forward feed a predetermined distance until the clutch member 30 is again thrown into a position to rotate the screw for a second slow forward feed, as at *e*, after which a dog 62 is provided to engage the arm 43, to disengage the clutch member 11, bringing the nut at rest with the clutch member 11 remaining in engagement, or in driving connection with the screw shaft, the various shifting elements occupying the position shown at *f*, producing a quick return, and at the end of the return stroke, a tripping dog 65 is provided, to disengage the driving engagement of the screw, bringing the carriage to rest.

In Fig. 9, *a* shows the parts in idle position, *b* the clutch member shifted for fast forward, which shifting is manual, the next step *c* shifting the clutch 30 to produce a slow forward feed, with the next step *d* disengaging the clutch for a fast forward, the clutch 30 being disengaged, the next step *e* disengaging clutch 11, bringing the carriage to rest, and the next step *f* engaging clutch 30 by manual operation, producing a quick return and at the end of its return stroke the clutch 30 is disengaged from the screw shaft, bringing the carriage to rest. This latter system of carriage control is one in which it is necessary to remove the work, or adjust the cutter so as not to engage the work on the return stroke, while in the system in Fig. 8, the work and cutters are of such nature as to enable the carriage to be automatically returned to normal without injury to the work or cutting tool.

The two illustrations herewith in the system of control are ones of many, and it will be seen that the shifting of clutches, of the screw shaft or nut are in sequence, the one following the other, in other words, it is not necessary to shift both simultaneously to produce the various steps of operation, while, of course, simultaneous shifting can be accomplished if required.

To prevent the screw shaft from being locked against rotation while the nut is at rest for a hand feed, I provide the following mechanism or means:—The lever 36 for shifting the clutch 11, is provided with a projecting lug 66 adapted to engage with a boss 67 projected from one side of the lever 50, provided for shifting the clutch member 30, whereby it will be seen that it will be impossible to throw clutch member 30 into its screw shaft locking position, while the nut is at rest as will be clearly seen from Fig. 7, that the two levers will engage with each other, as both in such instance are in a direction toward each other, which would bring the boss and lug of the respective levers into engagement, in which instance, if manipulation of either one of them were made toward their opposing movements, the nut would be thrown into driving connection, producing a power feed, and which would have to be disengaged for hand operation, and to do such, it would be necessary to move the clutch shifting lever of the clutch 30 to a position to disengage the same from its screw shaft locking connection or position. This forms a safety means for locking the screw shaft against rotation when it is desired to rotate the same by hand.

Having described my invention, I claim:—

1. A machine of the nature disclosed combining a frame, a carriage movable thereon, a feed screw journaled on the carriage, a driving shaft journaled in the frame parallel with the feed screw, a pair of intermeshing gears between the feed screw and shaft, a clutch element concentric with the screw for connecting said screw and shaft through said gearing, a nut engaging the screw and journaled against longitudinal movement, and a set of intermeshing gears between said shaft and said nut for connecting said shaft and nut through said gearing.

2. A machine of the nature disclosed combining a screw, a non-translatably journaled nut therefor, a shaft journaled in parallelism with said screw, intermeshing non-translatable gears between said shaft and screw, a clutch element splined to said screw and alternately movable to connect said gears with said screw or to hold said screw against rotation, a second set of gears between the nut and shaft, and clutching mechanism for operatively connecting said shaft and nut through said gears, whereby the rotation of the screw and nut either independently or simultaneously may correspondingly control the longitudinal feed of the screw in its forward or its reverse travel.

3. A machine of the nature disclosed combining a traveling carriage, feeding mechanism therefor comprising a rotatable screw, a non-translatable nut concentrically engaged with the screw, a driving element for rotating the screw, clutching mechanism adapted in alternate positions to rotate the screw, or to release the same, a driving element for rotating the nut, and clutching mechanism adapted in alternate positions to rotate the nut, or to release the same, whereby either the nut or screw may be confined against rotative movement during the activity of the other.

4. A machine of the class described combining a longitudinally confined driving shaft, a longitudinally movable screw shaft journaled in parallelism therewith, a longitudinally confined nut concentrically engaging with said screw shaft, intermeshing gears between said screw shaft and driving shaft, clutching mechanism therefor to operatively connect said shafts, a series of gears concentrically fixed on said nut and operative to vary the rotative speeds of said nut, a gear on said shaft longitudinally movable thereon selectively to engage the same with any one of said series of gears on the nut, and clutching mechanism for enabling said nut to be rotated by power derived from said driving shaft and transmitted through one of the gears of said series.

5. A machine of the class described combining a driving shaft and a screw-shaft journaled in parallelism, intermeshing gears interposed between said screw-shaft and driving-shaft for operatively connecting the same, clutching mechanism therefor, a nut confined against longitudinal travel and journaled concentric with the screw-shaft, a series of gears yielding different speed ratios concentrically fixed to said nut, a sliding gear for connecting said shaft with any one of said series of gears, whereby the rotation of the nut may be varied relatively to the rotation of the screw, and means for separately controlling the rotation of the screw or nut for varying longitudinal speed of the screw.

6. A machine of the nature disclosed combining a frame, a carriage movable thereon, a longitudinally movable screw-shaft journaled upon the carriage, a gear journaled in the frame concentric with said screw shaft, a clutch member slidably connected with said screw shaft and movable to alternate positions for connecting said gear to said screw-shaft or for arresting the motion of said gear, a cylindrical nut journaled in said frame confined against longitudinal movement concentrically engaging said screw-shaft, a series of gears fixed to said nut having different speed values, and driving means for all of said gears.

7. A machine of the nature disclosed combining a carriage, a feed-screw journaled thereon and moving therewith, a nut concentrically engaging the screw and confined against longitudinal movement, a driving shaft for the nut and screw journaled parallel therewith, a series of equal diameter gears fixed on said nut and provided with different numbers of teeth, a slidable gear on said driving shaft capable of engaging any one of said series of gears, clutching mechanism for simultaneously or independently controlling the rotation of said nut and screw, and for locking the respective driven elements against rotation when moved to an idle position, and means for automatically controlling said clutches within predetermined limits of carriage travel.

8. A machine of the nature disclosed combining a carriage, a screw and nut, means for independently or simultaneously rotating them at different speeds for longitudinally feeding the screw, clutch-mechanism for controlling the rotation of the nut, clutch-mechanism for controlling the rotation of the screw, and automatic clutch operating means comprising a rock-member operatively connected with said clutch-mechanism, adjustable means mounted on said carriage arranged in pairs capable of engaging said rocking element at predetermined intervals of carriage travel for rocking the rock element into opposite positions for throwing said clutching-mechanism into and out of operative position with the screw for changing the feed movement of the screw and its carriage.

9. A machine of the nature disclosed combining a carriage, a feed-screw therefor, a nut concentrically engaging with said screw rotatively journaled and confined against longitudinal movement, a driving-shaft for rotating said screw and nut, gearing connecting said driving shaft and nut, gearing connecting said driving shaft and screw, loose on said screw, clutching mechanism for connecting said gearing and screw, and automatic clutch operating means comprising a rock member operatively connected with said clutching mechanism, a pair of tripping dogs adjustably mounted on said carriage adapted to engage said rock member at intervals of carriage travel to swing the rock-member into opposite positions for throwing the clutch mechanism into and out of operation, thereby automatically changing the feed of the carriage.

10. A feed change mechanism of the nature disclosed combining a screw, a power shaft, a driven gear loosely concentric with said screw and permanently geared to said power shaft, a nut on said screw, a driving gear loosely circumscribing said power shaft and geared to said nut, and means for locking said driven gear to its screw or said driving gear to its shaft.

11. A feed change mechanism of the nature disclosed combining a frame, a nut and a tubular member journaled therein, a splined screw extending through said nut and loosely through said member, a clutch shiftably splined to said screw adapted to lock it to said member or to said frame, and means for rotating either said nut or member independently of the other.

12. A feed change mechanism of the nature disclosed combining a stationary element, a splined screw, a nut thereon, a tubular member rotatably concentric with said screw, a part splined to said screw, means for locking together said part and member or said part and element, and means for rotating either said nut or member independently of the other.

13. A feed change mechanism of the nature disclosed combining a frame providing three fixed bearings spaced apart in axial alinement, a nut journaled in two of said bearings, a gear journaled in the third bearing, a screw engaging the threads of said nut and loosely extending through said gear, a clutch splined to said screw and axially shiftable into engagement with said gear to enable it to rotate said screw, and means for rotating said gear or said nut.

14. A feed change mechanism of the nature disclosed combining a screw, a nut to translate said screw, a rotator to rotate said screw, a power shaft, a gear loose on said shaft operatively geared to one of said screw-actuating parts, a clutch for establishing a driving relation between said shaft and said gear, and operating means movable into a position obstructing the rotation of said gear and adapted simultaneously to move said clutch away from said gear.

15. A feed change mechanism of the nature disclosed combining a screw, a nut, a power-shaft, a member loose on said screw and geared to said shaft, a part loose on said shaft and geared to said nut, a pair of clutches both located in a common plane transverse to said shaft, the one being splined to said screw and the other splined to said shaft, and means for shifting said clutches.

16. A feed change mechanism of the nature disclosed combining a screw, a nut, a power shaft, a member loose on said screw and geared to said shaft, a part loose on said shaft and geared to said nut, a pair of clutches, one being splined to said screw and the other splined to said shaft, a pair of independently movable arms for operating said clutches, and means limiting the relative movement of said arms while permitting their movements in unison.

17. A feed change mechanism of the nature disclosed combining a screw, a nut, a power shaft, a member loose on said screw and geared to said shaft, a part loose on said shaft and geared to said nut, a pair of clutches, one being splined to said screw and the other splined to said shaft, a pair of independently movable arms for operating said clutches, and a stop projecting from one of said arms adapted to impact the other arm to restrict the relative movement therebetween.

18. A feed change mechanism of the nature disclosed combining a screw, a nut, a power shaft, a member loose on said screw and geared to said shaft, a part loose on said shaft and geared to said nut, a pair of clutches, one being splined to said screw and the other splined to said shaft, a pair of independently movable arms for operating said clutches, both of said arms having a common pivot and one having a projection adapted to be brought into engagement with the other, whereby they may be moved in unison or independently scissors-like.

19. A feed change mechanism of the nature disclosed combining a screw, a nut, a power shaft, a member loose on said screw and geared to said shaft, a part loose on said shaft and geared to said nut, a pair of adjacent clutches arranged side-by-side, the one being splined to said screw and the other splined to said shaft, an operating arm extending between said clutches and engaging one of the same, a second operating arm extending into engagement with the other clutch on the opposite side thereof, and means for actuating said arms independently or simultaneously.

20. A feed change mechanism of the nature disclosed combining a screw, a nut, power driven mechanism adapted to be brought into driving relation with said nut, a device for locking said screw against rotation, and means enabling said device to be moved into its screw locking position only when said mechanism is brought into locking relation with said nut.

21. A feed change mechanism of the nature disclosed combining a nut, a screw, power driven mechanism adapted to be brought into driving relation with said nut, a device for locking said screw against rotation, and a connection between said device and mechanism adapted to move said mechanism into driving relation with said nut when said device is moved into locking relation with said screw.

22. A speed change mechanism of the nature disclosed combining a screw, a nut, means for rotating the screw, a clutch splined to the screw movable in one direction to engage said means, a power-shaft, a member movable in an opposite direction on said shaft to establish driving relation between it and said nut, and operating means enabling said clutch and member to move freely in opposite separating directions and restricting their relative movement in opposite approaching directions.

23. A speed change mechanism of the nature disclosed combining a pair of rotatable members arranged to shift along different axes spaced apart, a first means for shifting one of said members, a second means for shifting the other member and adapted to have its limit of movement in one direction only determined by the position of said first means.

24. A speed change mechanism of the nature disclosed combining a screw, a nut, means movable into any one of three positions, the first adapted to establish a driving connection with one of said parts, the second adapted to disconnect it and enable it to be freely rotated manually, the third adapted to lock said part against rotation, a spring-pressed detent mechanism adapted to hold said means in any one of said three positions.

25. A speed change mechanism of the nature disclosed combining a screw, a nut, a power driven rotator, clutch mechanism for connecting either said screw or nut with said power driven rotator, a pair of independently movable members for actuating said clutch mechanism, a spring-pressed detent mechanism adapted to resiliently hold either of said members in each of two independent positions, or resiliently hold said members simultaneously in a fixed mutual relationship with one another.

26. A speed change mechanism of the nature disclosed combining a screw, a nut, means for rotating said parts, clutch mechanism for determining the operative relation between said rotating means and said parts, a pair of adjacent hand levers for operating said clutch mechanism, and a contact device intervening between said two levers for causing the one to move the other when the first is thrown into an extreme position in one direction.

27. A speed change mechanism of the nature disclosed combining a screw, a nut, power driven means for operating the same, clutch mechanism for connecting said means with the same, a pair of hand operated levers operating said clutch mechanism, stop mechanism for limiting the relative movement of said levers, a spring-pressed detent operative on each of said levers to mutually hold the same in a position determined by said stop mechanism, or to hold the same individually and independently in other positions.

28. A speed change mechanism of the nature disclosed combining a screw, a nut, a power driven shaft underlying said screw, a clutch on said screw adapted to connect it with said shaft, an underlying clutch on said shaft adapted to connect it with said nut, a pair of levers each pivoted about a vertical axis and each operating to actuate one of said clutches, and a pair of vertical rock shafts each adapted to actuate one of said levers and each having a hand lever for enabling it to be manually rocked.

29. A speed change mechanism of the nature disclosed combining a screw, a nut, power driven means for rotating either said screw or nut, or both, clutch mechanism for determining the operative relation between said means and said parts, a traveling support adapted to be reciprocated by one of said parts, three dogs carried by said support, each having a contact point moving in a different line of travel, and clutch operating mechanism adapted to be actuated by one of said dogs to cause said nut and screw to be rotated simultaneously, to be actuated by another of said dogs to cause said nut alone to be rotated, and to be actuated by the third dog, to cause said screw alone to be rotated.

30. A speed change mechanism of the nature disclosed combining a screw, a nut, a rotator for one of said parts, a clutch for establishing driving connection between said rotator and said part, an oscillating member for operating said clutch, a traveling support reciprocated by said nut and screw, and two dogs propelled by said support in the same direction, the one being adapted to impact said member and oscillate it in one direction, and the other being adapted thereafter to contact said member and oscillate it in the opposite direction, whereby said clutch may be moved in and out of operative relation with its actuated part by the successive action of said dogs on a single trip member.

31. A speed change mechanism of the nature disclosed combining a screw, a nut, a clutch-controlled rotator for one of said parts, a clutch, a member actuating said clutch having two differently positioned actuating contact surfaces, a support reciprocated by said nut and screw, a dog carried by said support adapted to clear one contact surface and operate said member by abutting the other contact surface, and a second dog differently positioned on said support adapted to clear the other contact surface and operate said member by abutting the first-mentioned contact surface thereof.

32. A speed change mechanism of the nature disclosed combining a screw, a nut, means for rotating either or both of said parts, two clutches, the one controlling the rotation of the screw and the other controlling the rotation of the nut, an actuator determining the position of one clutch, an oscillating member determining the position of the other clutch, a support reciprocated by said nut and screw, a pair of dogs on said support adapted in succession to actuate said oscillating member to move it into and out of a given position, and a third dog carried by said support adapted to impact said actuator to shift the position of the clutch controlled thereby.

33. A speed change mechanism of the nature disclosed combining a screw, a nut, a clutch movable to cause said screw to be rotated, a second clutch movable to cause said nut to be rotated, a clutch actuator adapted to be positioned manually to cause the one clutch to enable its part to be rotated, an oscillating member adapted to shift the other clutch into and out of operative relation with its part, a support actuated by said nut and screw, a pair of dogs on said support, the first adapted to swing said member into a position whereby said nut and screw will rotate simultaneously and the other adapted to swing it into a position whereby but one of said parts will rotate, and a third dog on said traveling support, adapted to impact said clutch actuator to disconnect the driving relation of the clutch actuated thereby.

34. A speed change mechanism of the nature disclosed combining a screw, a nut, an oscillating member manually movable into a position inoperative to cause said screw to be turned, an actuator manually movable into a position to cause said nut to be turned, a support propelled rapidly by said nut and screw when said member and actuator are in the above positions, a dog on said support adapted to move said member into another position whereby said screw will be turned simultaneously with said nut and said support propelled slowly, a second dog on said support adapted to impact said member and move it to its initial position, disconnecting the rotation of said screw whereby said support will be moved rapidly by said rotating nut, a third dog operative on said member to again move it in position to cause said screw to be turned simultaneously with said nut and said support again propelled slowly, and a fourth dog adapted to impact said actuator to move it into a position inoperative to cause said nut to be turned, whereby said support will be moved rapidly in a reverse direction by said rotating screw.

35. A speed change mechanism of the nature disclosed combining a screw, a nut, an actuator adapted in one position to cause one of said parts to be rotated, an oscillating member adapted in one of its positions to cause said other part to be rotated, a traveling support propelled by said nut and screw, a dog adapted to move said member into its operative position whereby said nut and screw will be simultaneously rotated, another dog on said support adapted to move said member into another position, whereby one of said parts alone will be rotated by reason of the position of said actuator, and a third dog on said support adapted to move said actuator whereby the rotation of said last-mentioned part will be discontinued.

36. A speed change mechanism of the nature disclosed combining a screw, a nut, an actuator for enabling one of said parts to be rotated, an oscillating member for enabling the other part to be rotated, a traveling support actuated by said nut and screw, a pawl dog on said support adapted to impact said member to move it in one direction, a second rigid dog on said support adapted to impact it and move said member in the opposite direction and ride by the same, and another dog adapted to move said actuator to reverse the travel of said support whereby said pawl dog may ride by said member without actuating the same.

37. A speed change mechanism of the nature disclosed combining a traveling support, propelling mechanism therefor, a pair of control levers for said mechanism, the one lever being adapted in alternative positions to cause said support to travel rapidly and slowly when said other lever is in a predetermined position, dogs on said support adapted to move said first-mentioned lever alternately into its fast and slow positions, and another dog on said support adapted to move said other lever out of its predetermined position when said support is moved slowly, and effect a rapid reversal in the direction of travel of said support.

38. A speed change mechanism of the nature disclosed combining a traveling support, propelling mechanism therefor, a lever movable into forward and reverse positions to control said mechanism to correspondingly actuate said support, a speed regulator adapted when said lever is in its forward position to retard or accelerate the speed of said support, a plurality of dogs on said support adapted in succession to actuate said regulator to move it alternately into its fast and slow positions, a dog adapted to move said lever into reverse position when said regulator is in slow position or cause a reverse travel of said support, and a stop dog on said support adapted to move said regulator into its other position when said lever is in reverse position and stop the travel of said support.

39. A speed change mechanism of the nature disclosed combining a traveling support, a screw, a nut, clutch-controlled mechanism for rotating the same, a reverse lever adapted in its forward position to cause said nut to be turned, and in its reverse position to discontinue the rotation of said nut, a speed regulator, adapted in one position to cause said screw to turn, and in its other position to discontinue the rotation thereof, dogs on said support adapted during the forward travel thereof successively to operate said regulator into its alternate positions, the last-acting dog of said series moving said regulator into a position causing said screw to rotate, another dog thereafter operating during the forward travel of said support to move said reverse lever into a position discontinuing the rotation of said nut whereby the support will be reversely propelled, and a stop dog at the end of the stroke of the support adapted to actuate said regulator into a position discontinuing the rotation of said screw, whereby said support will come to a stop.

40. A speed change mechanism of the nature disclosed, combining a screw, a nut, a lever adapted movably to effect a rotation of one of said parts, a member movable to effect a rotation of the other of said parts, a support propelled by said nut and screw, a dog on said support adapted in either direction of travel thereof to move said member into a position causing the rotation of the part controlled thereby, a pawl dog on said support adapted to move said member into another position only when said support is moving in a predetermined direction, a third dog rigid with said support adapted during a reverse travel thereof to move said member into position, discontinuing the rotation of the part controlled thereby.

41. A speed change mechanism of the nature disclosed combining a screw, a nut, a rotator for rotating one of said parts, clutch mechanism, an oscillating member actuating said clutch mechanism having two contact surfaces located in different planes, a traveling support, and two dogs thereon each having a contact surface moving in different lines of travel, the one being adapted to abut the one contact surface on said member and the other being adapted to abut the other contact surface thereon.

42. A speed change mechanism of the nature disclosed combining a reciprocating support, actuating mechanism therefor, a pair of control levers, each effective to determine the operation of said mechanism, a single dog on said support adapted to shift the one lever without effecting the other, and a pair of dogs on said support, each adapted differently and independently to shift said other lever without effecting the first-mentioned lever.

43. A speed change mechanism of the nature disclosed combining a reciprocating support, actuating mechanism therefor, a pair of control levers, each effective to determine the operation of said mechanism, the one lever having two contact surfaces each in a different plane, and the other lever having a single contact point in a still different plane, and three dogs on said traveling support, each having a contact surface operating in a different line of travel.

44. A speed change gearing of the nature disclosed combining a traveling support; a continuously running power-shaft; a nut and a screw for transmitting motion from said shaft to said support; a nut-clutch movable to cause said power-shaft to rotate said nut; a screw-clutch movable to cause said power-shaft to rotate said screw; an automatic means actuated by said support for causing said shaft alternately in repeated succession first to rotate both the nut and screw simultaneously, and then to rotate but one of said parts; said means being adapted automatically at the end of a succession of said alternate operations to cause said power-shaft to rotate said other part only, whereby said traveling support will be caused to travel reversely at a relatively fast rate.

45. A speed change gearing of the nature disclosed combining a traveling support; a continuously running power-shaft; a nut and a screw for transmitting motion from said shaft to said support; a nut-clutch movable to cause said power-shaft to rotate said nut, or to brake said nut against rotation; a screw-clutch movable to cause said power-shaft to rotate said screw or to brake the same against rotation; and automatic means actuated by said support for causing said shaft alternately in repeated succession first to rotate the nut and screw simultaneously, and next to rotate but one of said parts, said means being adapted automatically at the end of a succession of said alternate operations to cause said power-shaft to rotate said other part only, whereby said traveling support will be caused to travel reversely at a relatively fast rate.

46. A speed change gearing of the nature disclosed combining a traveling support; a continuously running power-shaft; a nut and a screw for transmitting motion from said shaft to said support; a nut-clutch movable to cause said power-shaft to rotate said nut, or to brake said nut against rotation; a screw-clutch movable to cause said power-shaft to rotate said screw, or to brake the same against rotation; and automatic means actuated by said support for causing said shaft alternately in repeated succession first to rotate both the nut and screw simultaneously, and then to rotate but one of said parts..

47. A speed change mechanism of the nature disclosed combining a rotatable nut mounted against translation, a reciprocating table, a feed screw journaled on said table and meshing with said nut to propel said table, a rotator for said feed screw splined thereto, a first clutch mechanism for rotating said nut, a second clutch mechanism for rotating said rotator, a clutch actuator adapted to be operated by a dog on said table, and connections whereby each of said clutch mechanisms may be operated by said actuator.

48. A speed change mechanism of the nature disclosed combining a rotatable nut mounted against translation, a reciprocating table, a feed screw journaled on said table and meshing with said nut to propel said table, a rotator for said feed screw splined thereto, clutch mechanism whereby said nut may be rotated alone or said nut and rotator rotated simultaneously, an actuator for said clutch mechanism having two contact spurs or surfaces, each located in a different plane, and two dogs traveling with said table, the one dog having a contact surface adapted to clear one contact surface of the actuator, but abut the other contact surface thereof, and the other dog having a contact surface adapted to clear the other contact surface of said actuator and abut the complementary contact surface thereof.

49. A feed change mechanism of the nature disclosed combining a screw, a nut, having fixed thereto a plurality of differently toothed gears, a power-shaft located adjacent said screw, a shift gear deriving motion from said power-shaft and adapted to be meshed with any one of said nut gears, and means for rotating either said screw or said shift gear independently, or both simultaneously.

50. A feed change mechanism of the nature disclosed combining a screw, a nut thereon, a plurality of differently toothed gears movable as a unit with said nut, a power-shaft adjacent said screw, a gear splined to said power shaft and shiftable to enable it to be meshed with any one of said gears, clutch mechanism adapted to interrupt the driving relation between said power-shaft and said gear, and clutch mechanism for enabling said screw to be rotated positively.

51. A feed change mechanism of the nature disclosed combining a screw and an adjacent parallel power-shaft, a nut on said screw, a plurality of differently toothed gears movable as a unit with said nut, a sleeve loose on said power-shaft, a gear splined to said sleeve and adapted to be shifted therealong to be meshed with any one of said nut gears, a clutch intervening between said power-shaft and said sleeve, and clutch mechanism enabling said power-shaft to be geared to said screw to rotate it.

52. A feed change mechanism of the nature disclosed combining a screw and an adjacent parallel power-shaft, an elongated sleeve on said screw having a threaded engagement therewith forming a nut, a gear mounted on said sleeve and movable as a unit therewith, a sleeve mounted on said power-shaft, gearing between said first and last sleeves, a clutch between said last sleeve and said power-shaft, and gearing including a clutch enabling said power-shaft to rotate said screw.

53. An automatic table-propelling mechanism combining an advancing table, a member adjacent said table and providing different contact surfaces, a first dog movable with said table adapted to impact one of said contact surfaces to move said member into one position, a second dog movable with said table adapted to impact the other of said contact surfaces to move said member into another position, a propelling mechanism for imparting fast or slow speed to said table, and a shift mechanism controlled by said member and adapted on one position thereof to cause said propelling mechanism slowly to advance said table, and in another position thereof rapidly to advance said table.

54. An automatic table-propelling mechanism combining an advancing table, a member adjacent said table and providing different contact surfaces, a first dog movable with said table adapted to impact one of said contact surfaces to move said member into one position, a second dog movable with said table adapted to impact the other of said contact surfaces to move said member into another position, a propelling mechanism normally adapted slowly to propel said table, means abruptly adapted greatly to increase the propelling capacity of said mechanism, and a shift instrumentality controlled by said member and adapted in one position thereof to render said means ineffective and in another position to render it effective.

55. An automatic table-propelling mechanism combining an advancing table, a member adjacent said table and providing different contact surfaces, a first dog movable with said table adapted to impact one of said contact surfaces to move said member into one position, a second dog movable with said table adapted to impact the other of said contact surfaces to move said member into another position, a screw journaled in and longitudinally movable with said table, a nut threaded on said screw and confined against longitudinal movement, means for causing a slow relative movement between the screw and nut, means for abruptly increasing said relative movement, and mechanism controlled by said member and adapted in one position thereof to render effective only the first mentioned means, and adapted in another position to render effective the second mentioned means.

56. An automatic table-propelling mechanism combining an advancing table, a trip instrumentality adjacent said table and movable into different positions, a first dog movable with said table adapted when advancing therewith to impact said trip instrumentality and move it into one position, a second dog movable with said table adapted also when advancing therewith to impact and move it into another position, a propelling mechanism for imparting fast or slow speeds to said table, and a shift mechanism controlled by said instrumentality and adapted in one dog-determined position thereof to cause said propelling mechanism slowly to advance said table, and in the next succeeding dog-determined position thereof rapidly to advance said table.

57. An automatic table-propelling mechanism combining an advancing table, a trip instrumentality adjacent said table and movable into different positions, a first dog movable with said table adapted when advancing therewith to impact said trip instrumentality and move it into one position, a second dog movable with said table adapted also when advancing therewith to impact and move it into another position, a propelling mechanism normally adapted slowly to propel said table, means abruptly adapted greatly to increase the propelling capacity of said mechanism, and a shift device controlled by said instrumentality and adapted in one dog-determined position thereof to render said means ineffective and in the next succeeding dog-determined position to render it effective.

58. An automatic table-propelling mechanism combining an advancing table, a trip instrumentality adjacent said table and movable into different positions, a first dog movable with said table adapted when advancing therewith to impact said trip instrumentality and move it into one position, a second dog movable with said table adapted also when advancing therewith to impact and move it into another position, a screw journaled in and longitudinally movable with said table, a nut threaded on said screw and confined against longitudinal movement, means for causing a slow relative movement between the screw and nut, means for abruptly increasing said relative movement, and mechanism controlled by said instrumentality and adapted in one dog-determined position thereof to render effective only the first mentioned means, and adapted in another dog-determined position to render effective the second mentioned means.

59. An automatic table-propelling mechanism combining a movable table, table-propelling mechanism, two independently movable trip-devices adjacent said table, one of said trip-devices providing two contact surfaces each normally located in a different plane, a number of dogs movable with said table each having a contact surface, said surfaces alternating in succession between two paths of travel, whereby said last mentioned trip-devices will be actuated alternately into different positions by the advance passage of said dogs, means for causing said propelling-mechanism to actuate the table rapidly or slowly according to the position of said last mentioned trip-device, and means for determining the operation of said mechanism in accordance with the position of the other trip-device.

60. An automatic table-propelling mechanism combining a movable table, table-propelling mechanism, two independently movable trip-devices adjacent said table, one of said trip-devices providing two contact surfaces each normally located in a different plane, a number of latch-like dogs movable with said table and providing contact surfaces alternating in succession between a first and a second path of travel, whereby said last mentioned trip-device will be actuated alternately into different positions by the advance passage only of said dogs, means for causing said propelling-mechanism to actuate the table rapidly or slowly according to the position of said last mentioned trip-device, means for determining the operation of said mechanism in accordance with the position of the other trip-device, and a dog having a contact surface movable in a third path of travel for actuating said other trip-device.

In testimony whereof, I have hereunto set my hand.

ADOLPH L. DE LEEUW.

Witnesses:
OLIVER B. KAISER,
CLARENCE B. FOSTER.